United States Patent [19]

Hausberg

[11] Patent Number: 5,436,218
[45] Date of Patent: Jul. 25, 1995

[54] AGGLOMERATES FOR RECLAIMING UNCULTIVATED SOILS COMPRISING SUPERABSORBENT POLYMERS AND POLYBUTADIENE OIL ADHESIVE

[75] Inventor: Egbert Hausberg, Schermbeck, Germany

[73] Assignee: Huels Aktiengesellschaft, Marl, Germany

[21] Appl. No.: 103,228

[22] Filed: Aug. 9, 1993

[30] Foreign Application Priority Data

Nov. 6, 1992 [DE] Germany .................. 42 37 503.7

[51] Int. Cl.6 .................. A01N 25/08; A01N 25/26;
A01N 63/00; C09K 17/40
[52] U.S. Cl. .................. 504/101; 504/116;
504/117; 71/903; 71/DIG. 1; 424/93.4;
424/421; 424/93.5; 514/949
[58] Field of Search ............. 71/DIG. 1, 903;
504/116, 101, 117; 424/93 D, 93 Q, 421;
514/949

[56] References Cited

U.S. PATENT DOCUMENTS

| | | | |
|---|---|---|---|
| 4,015,970 | 4/1977 | Hennart | 71/11 |
| 5,057,326 | 10/1991 | Sampson | 424/711 |
| 5,120,344 | 6/1992 | Libor et al. | 71/27 |

FOREIGN PATENT DOCUMENTS

| | | |
|---|---|---|
| 0072213 | 2/1983 | European Pat. Off. . |
| 0475433 | 3/1992 | European Pat. Off. . |
| 0495108 | 7/1992 | European Pat. Off. . |
| 2635333 | 2/1990 | France . |

*Primary Examiner*—S. Mark Clardy
*Attorney, Agent, or Firm*—Oblon, Spivak, McClelland, Maier & Neustadt

[57] ABSTRACT

The invention relates to agglomerates which are permeable to gas, absorbs and stores liquids and comprises:
A) a mineral carrier material,
B) a water-insoluble polymer which absorbs and stores liquids,
C) an adhesive and
D) optionally appropriate additives and adjuvants.

The agglomerates are outstandingly suitable for reclaiming uncultivated soils, in particular slopes, landfill sites, arid areas as well as golf courses and the like.

20 Claims, No Drawings

AGGLOMERATES FOR RECLAIMING UNCULTIVATED SOILS COMPRISING SUPERABSORBENT POLYMERS AND POLYBUTADIENE OIL ADHESIVE

BACKGROUND OF THE INVENTION

1. Field of the Invention

The invention relates to agglomerates for reclaiming uncultivated soils, in particular slopes, landfill sites, arid areas as well as golf courses, and also for sustaining vegetation on extreme sites such as flat and pitched roofs.

2. Discussion of the Background

It is known to regulate the water balance of soils by incorporating water retention agents. To this end, the so-called superabsorbers are used, which can absorb a multiple of their own weight of water, forming a hydrogel. A further characteristic of these superabsorbers, which are used specifically for the above-mentioned purpose, is that the stored water is available to plants, i.e. water is extracted from the gel by the suction pressure of the plant roots which have penetrated the gel.

However, distributing the required amount of superabsorbers, which is relatively small, in the soil in a homogeneous and uniform manner is a general problem.

In this context, the prior art describes, inter alia, the preparation and use of gels based on clay minerals and water-soluble superabsorbers (EP-335,653) or other polymeric compositions based on superabsorbers (WO 91/11410). However, the preparation of such gels is very complicated. According to EP-335,653, the gels must be activated in a further preparation step before they are used. In addition, their transport to the end consumer is not without problems due to the high weight of the water-containing gels.

Equally, the preparation of gels from dry compositions, consisting of superabsorber and mineral substances, is not a simple procedure.

A further problem is the incorporation of these more or less viscous, gel-like compositions into the target soil.

It is also known to attach water-insoluble synthetic polymers to non-woven synthetic fibers and to use the products as soil improvers (High Perform. Text. Jun. 1990, p. 6–7).

However, the drawbacks of the prior technologies makes the application of superabsorbers to soil retention, a complex problem in search of a more simple solution.

SUMMARY OF THE INVENTION

It is therefore an object of the present invention to provide a water retention system based on superabsorbers and which, on the one hand, can be incorporated into, or applied to, the soils to be improved in a relatively simple manner and which, on the other hand, is simpler in its preparation.

Another object is to provide a light weight water-retention system which can be transported without problems.

The objects of the present invention is achieved by an agglomerate which is permeable to gas, absorbs and stores liquids and comprises:

A) a mineral carrier material;
B) a water-insoluble polymer which absorbs and stores liquids;
C) an adhesive; and
D) optionally appropriate additives and adjuvants.

It was surprisingly discovered that the preferably used adhesive based on polybutadiene oils which are liquid at room temperature provided an excellent adhesion between the mineral carrier material A) and the water-insoluble polymer B) which absorbs and stores liquids, without adversely affecting their characteristics with regard to porosity and absorption of growth factors or absorption of water because of undue bonding.

DETAILED DESCRIPTION OF THE PREFERRED EMBODIMENT

As mineral carrier material, there are suitable, in principle, natural materials such as, for example, expanded clay, slate, quartz, bentonite, lava, breeze concrete, perlite, pumice and cinders, as well as synthetic granules with a particle diameter of 1 to 8 mm. Suitable mineral carrier materials are readily available from commercial sources.

The preferably employed carrier material is an expanded clay (for example LECATON®, manufactured by Leca, Pinneberg, Germany), since this material is particularly capable of storing the additives and adjuvants mentioned under D). The mineral carrier material can be supplemented, by means of a nutrient solution, with, inter alia, bacteria, Mycorrhiza fungi, fungicides, herbicides, pesticides, fungal cultures and other additives such as, for example, natural and artificial fertilizers as well as nutrients and pH regulators.

Generally suitable water-insoluble polymers which absorb and store liquids are the so-called synthetic superabsorbers such as, for example, poly(meth)acrylic acid, poly(meth)acrylamide, acrylamide/acrylic acid copolymers. Suitable water-insoluble polymers can be made by conventional means known to those of ordinary skill in the art.

Preferably employed, however, are acrylic acid/acrylamide copolymers (for example STOCK-OSORB®, manufactured by Stockhausen, Krefeld, Germany). The particle diameter of the superabsorber attached to the mineral carrier is in the range of 0.2 to 1.0 mm (medium particle size), preferably 0.4–0.6 mm. This particle size is particularly preferred since, after water has been absorbed, the particles should have a particular preferred size which allows the roots to penetrate in order to take up water.

Depending on the intended use, the amount of attached superabsorber can be within a range of 1 to 5% by weight preferably 2–4% by weight relative to the total weight of components A) and C).

In general, the adhesive which can be employed are substances which, when used in the adhesive process, do not adversely affect the properties of components A) and B), i.e. the permeability to gas and the porous structure of the mineral carrier as well as the capacity of the superabsorber of relatively rapidly absorbing water and storing it, must essentially be retained. These substances include all polymers which can be emulsified with water such as, for example, polybutadiene, polyacrylates, styrene copolymers and the like. Suitable adhesive substances can be made by conventional means known to those of ordinary skill in the art.

Adhesives which were found particularly advantageous according to the invention are those based on polybutadiene oils which are liquid at room temperature. The preparation of these polybutadiene oils by conventional methods is known to those of ordinary skill in the art.

Preferably used substances are low-viscosity 1,4-polybutadiene oils which are mainly in the cis configuration from the stereospecific point of view and whose cis-1,4 content is within a range of 70% and above and which have a 1,2-vinyl content of less than 1.5%.

The number average molecular weight of the stereospecific low viscosity polybutadiene oils which are suitable in the context of the invention varies from approximately 1,800 to 3,000 g/mol and the viscosity at 20° C. is in the range from 700 to 330 mPa s, depending on the molecular weight. The specific gravity of the polybutadiene oils used is 0.90 to 0.92 g/m$^3$.

The adhesive is employed in an amount of 1 to 5% by weight relative to 100% by weight of the mineral carrier A), preferably 1 to 3% by weight.

The polybutadiene oils can be employed as adhesives as pure substances, i.e. having a solids content of above 99% by weight or in an aqueous emulsion having a variable solids content of 25 to 50% by weight.

The polybutadiene oil may contain the processing aids and adjuvants known in the prior art such as, for example, siccatives, wetting agents, antifoams and water.

The agglomerates according to the invention can be prepared in such a way that, in a pan mixer or positive mixer, component A) is treated with component C) at a temperature of 20° C. and this mixture is mixed thoroughly for 2 to 5 minutes. Component B) is then added, and mixing is continued for 1–4 minutes.

Polybutadiene oil can also be used in the form of an aqueous emulsion. The preparation procedure is analogous to the procedure using pure polybutadiene oil. The water is subsequently removed and the agglomerate is dried in a drying kiln at 80° C.

Other preparation methods are spray-drying or the use of multi-component flooring machines on site, for example in the case of vegetation-sustaining roofs.

As a rule, the additives and adjuvants when present are incorporated before preparation of the agglomerate by injecting them into the porous carrier material prior to binding with components B) and C).

The agglomerates according to the invention are distinguished by the fact that they are capable of storing large amounts of liquids, for example rain water, in a relatively short time and release these liquids continuously into the environment over a prolonged period. This is also to be understood as meaning releasing the water to plants which have penetrated the agglomerate, or the water-soluble polymer itself, by means of their root system. The above-mentioned process can be repeated up to 20–30 times without the regulating effect subsiding essentially, but it also depends on the soil structure and soil composition.

Moreover, the mineral carrier releases the additives and adjuvants slowly into the environment over a prolonged period. Accordingly, the agglomerate provides a sort of slow-release effect with regard to water balance and plant growth substances. It is therefore particularly suitable for reclaiming so-called uncultivated soils. These are to be understood as meaning, in particular, the preparation of slopes, landfill sites, arid areas as well as golf courses for sustaining vegetation on a large scale.

A great advance provided by the agglomerates according to the invention is the fact that their dry weight is very low. This is advantageous for packaging, transport and storage. Taking into account that the absorption of water by the superabsorbers entails a substantial increase in weight, then the advantage, compared with the prior art, for certain intended uses, for example vegetation-sustaining roofs, will be readily seen.

The agglomerates according to the invention are suitable for reclaiming uncultivated soils of any type, but in particular for slopes, contaminated soils (landfill sites, industrial area), and areas, golf courses, substrates for patio plants and container plants, for sustaining vegetation on noise protection dams, drainage systems in the construction of sports grounds, as well as for sustaining vegetation on flat and pitched roofs.

In order to reclaim uncultivated soils the agglomerate of the present invention is added in an amount of 1–5% by weight relative to the uncultivated soil to be reclaimed. The small particle size allows the agglomerate to be easily dispersed throughout the uncultivated soil.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters patent of the United States is:

1. An agglomerate comprising:
   A) an agriculturally acceptable mineral carrier material,
   B) a water-insoluble polymer which absorbs and stores liquids, selected from the group consisting of poly(meth)acrylic acid, poly(meth)acrylamide, acrylic acid/acrylamide copolymers and mixtures thereof,
   C) polybutadiene oil as an adhesive, and
   D) optional agriculturally acceptable additives and adjuvants,
   wherein said agglomerate is permeable to gas, absorbs and stores liquids.

2. The agglomerate of claim 1, wherein said mineral carrier material A) is selected from the group consisting of expanded clay, slate, quartz, bentonite, lava, breeze concrete, perlite, pumice, cinders, synthetic granules and mixtures thereof with a particle diameter of 1 to 8 mm.

3. The agglomerate of claim 1, wherein said polymer B) comprises acrylic acid/acrylamide copolymers.

4. The agglomerate of claim 1, wherein said adhesive contains a stereospecific low-viscosity polybutadiene oil.

5. The agglomerate of claim 1, wherein said additives and adjuvants are selected from the group consisting of bacteria, Mycorrhiza fungi, fungicides, herbicides, pesticides, fungal cultures, natural and artificial fertilizers, nutrients, and pH regulators.

6. The agglomerate of claim 2, wherein said polymer B) comprises a polymer selected from the group consisting of poly(meth)acrylic acid, poly(meth)acrylamide, acrylic acid/acrylamide copolymers or mixtures of these.

7. The agglomerate of claim 2, wherein said polymer B) comprises acrylic acid/acrylamide copolymers.

8. The agglomerate of claim 2, wherein said adhesive contains a stereospecific low-viscosity polybutadiene oil.

9. The agglomerate of claim 2, wherein said additives and adjuvants are selected from the group consisting of bacteria, Mycorrhiza fungi, fungicides, herbicides, pesticides, fungal cultures, natural and artificial fertilizers, nutrients, and pH regulators.

10. The agglomerate of claim 1, comprising 1 to 5% by weight, based on the total weight of mineral carrier material and adhesive, of said water-insoluble polymer.

11. The agglomerate of claim 1, comprising 1 to 5% by weight relative to 100% by weight of said mineral carrier material, of said adhesive.

12. The agglomerate of claim 2, comprising 1 to 5% by weight, based on the total weight of mineral carrier material and adhesive, of said water-insoluble polymer.

13. The agglomerate of claim 2, comprising 1 to 5% by weight relative to 100% by weight of said mineral carrier material, of said adhesive.

14. A method for reclaiming uncultivated soil comprising treating uncultivated soil to be reclaimed with an amount of the agglomerate of claim 1 effective for increasing water retention.

15. A method of claim 14, wherein 1 to 5% by weight of said agglomerate is added relative to the weight of the uncultivated soil to be reclaimed.

16. The method of claim 14, wherein said uncultivated soil is a golf course.

17. The method of claim 14, wherein said uncultivated soil is a vegetation sustaining noise protection dam.

18. The method of claim 14, wherein said uncultivated soil is a vegetation sustaining flat or pitched roof.

19. The method of claim 14, wherein said uncultivated soil is a sports ground.

20. The method of claim 14, wherein said uncultivated soil is a patio planter.

* * * * *